May 31, 1955 — E. M. CROWELL — 2,709,310
STIFFENING METHODS FOR SHOES AND STIFFENERS
Filed May 12, 1951

Inventor
Ernest M. Crowell
By his Attorney

United States Patent Office 2,709,310
Patented May 31, 1955

2,709,310

STIFFENING METHODS FOR SHOES AND STIFFENERS

Ernest M. Crowell, Beverly, Mass., assignor to United Shoe Machinery Corporation, Flemington, N. J., a corporation of New Jersey Application May 12, 1951, Serial No. 226,008

5 Claims. (Cl. 36—77)

This invention relates to heat hardenable compositions and methods of making and using them and particularly to a new article for stiffening portions of the uppers of shoes and to methods of stiffening shoes with the new article.

In the stiffening of uppers it is common to incorporate in an assembled upper a stiffener blank which is softened and rendered limp by the action of a solvent or of heat. The assembled upper with the softened blank in place is conformed to a last and the blank then becomes hard and resilient in its lasted shape upon evaporation of the solvent or upon dissipation of the heat. It is difficult to maintain the blanks limp and in condition for being conformed to the last for just the right time and then to have them become hard soon afterward so that the last may be removed from the shoe.

It has been proposed to employ stiffener blanks which carry thermosetting resinous compositions in uncured state so that the blanks are normally limp when cold and dry. Such a blank is incorporated in an assembled shoe upper and the shoe conformed to a last. The part of the shoe upper which contains the stiffener blank is then subjected to heat to cure the resin to a hard stiff condition. In many cases an extended period of heating is required to cure the resin. Also there is an appreciable tendency for a thermosetting resin to set up on storage so that the stiffener blank becomes stiff and unusable.

It is a feature of the present invention to provide a method for stiffening articles wherein through the action of a modifying agent on resin particles, stiffening may be secured at a relatively low temperature.

It is a further feature of the present invention to provide a normally limp, moldable and stable heat hardenable composition which is hardened by a heat induced physical interaction of the components of the composition.

I have discovered a new heat hardenable stiffening material and method wherein the material is capable of storage indefinitely but is rapidly convertible by heat to a stiff resilient composition. This new material comprises as the active agent a two-phase system of which the discontinuous phase comprises fine particles of thermoplastic resin and the continuous phase comprises a modifying agent which does not affect the resin particles at atmospheric temperatures but which combines with, softens and fuses together the resin particles at elevated temperatures. The stiffening material is ordinarily employed as a sheet material either unsupported or coated on or impregnated into a fabric base. The stiffening material is hardened by heating to cause the modifying agent to combine with and soften the resin, and to fuse the resin particles together. The continuous phase is a plastic mixture comprising a rubbery material as well as a modifying agent. A portion of the modifying agent leaves the rubbery material and combines with the resin particles on heating so that an additional stiffening effect is obtained by the withdrawal of modifying agent from the rubbery material.

The new stiffening material is limp, flexible and stretchable prior to heating and forms a strong, stiff, resilient body after heating. The composition does not rely on thermosetting or polymerization of resins and possesses indefinite shelf life. Stiffener blanks for stiffening the end portions of shoe uppers according to the present invention are manufactured by forming thin sheets of the new composition having an outline shaped to correspond to the outline of end portions of shoe uppers. These stiffener blanks are easily inserted within the plies of a shoe upper prior to lasting; and are converted by heating to a stiff resilient condition binding the plies together and providing desirable stiffness and shape-retaining ability to the shoe.

The new composition may also be applied to a surface, e. g., the interior of a container, and cured to provide a tough strong coating.

The invention will be further described in connection with the accompanying drawings forming part of the disclosure of the present case.

Figure 1:
Fig. 1 is an enlarged sectional view of the normally limp, stable stiffener material before heating.

The stiffener of the present invention is a sheet material 10 (see Fig. 1) hardenable by heat to a strong, stiff, resilient condition wherein the stiffening action is obtained by the combination of a continuous phase 12 comprising a modifying agent and a discontinuous phase comprising fine particles 14 of resinous material. The resin and modifying agent composition is soft and flexible prior to heating and hardens when subjected to heat by the physical interaction of the resinous material with the modifying agent to form a hard stiff body of modified resin.

Figure 2:
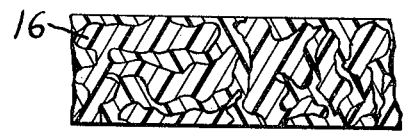
Fig. 2 is an enlarged sectional view of the stiffener material after heating.

The property of becoming stiff and hard upon heating of the present resin-modifying agent dispersion is not found in resin products obtained by heating conventional resin-plasticizer dispersions. That is, in order that the particles of resin in a conventional resin-plasticizer dispersion may unite into a continuous substantially homogeneous body, it is required that a relatively high proportion of plasticizer be used and that the plasticizer possess at elevated temperature significant solvent action on the resin particles so that the plasticizer-softened resin particles will coalesce. Such compositions are too soft at atmospheric temperature for use as stiffeners. The new hardenable materials are a special combination of resins and modifying agents wherein the modifying agents exhibit greater affinity for the resin particles 14 at elevated temperatures than at normal temperatures. At elevated temperatures in the special combination of the present invention, the modifying agents soften the resin particles 14 so that they coalesce into a continuous body 16 (see Fig. 2); but at normal temperatures the modifying agents show little plasticizing effect and do not provide a high degree of internal lubrication or flexibilizing effect on the resin.

Figure 3:
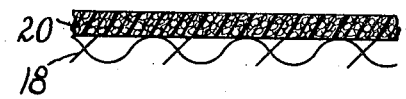
Fig. 3 is an enlarged sectional view of a fabric base impregnated with the stiffener material.

In compositions which have been found useful in stiffening, the flexibilizing effect of the modifying agent on the resin in the solidified material has been as great as needed where sufficient modifying agent is used to enable the resin particles to coalesce when heated. To obtain the desired stiffness, it is preferred to use relatively low modifying agent content, and in many cases such compositions have a consistency which renders them difficult to spread. To facilitate spreading on fabric 18 (see Fig. 3) to provide a fabric reinforced stiffening sheet, the resin dispersions are ordinarily thinned by addition of a volatile organic solvent. Coatings deposited from such solvent containing compositions form a dry somewhat leathery feeling deposit 20 on or in the fabric 18 after evaporation of the solvent.

Figure 4:
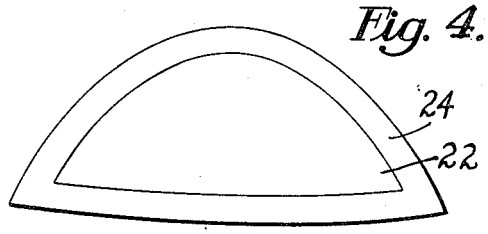
Fig. 4 is a plan view of a toe stiffener blank cut from the stiffener material.
Figure 5:
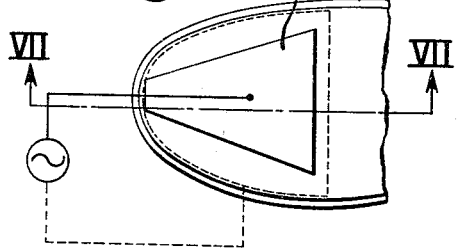
Fig. 5 is a plan view of the toe portion of a shoe on a last showing the positioning of the toe portion between electrodes for heating by a high-frequency electric field.
Figure 6:
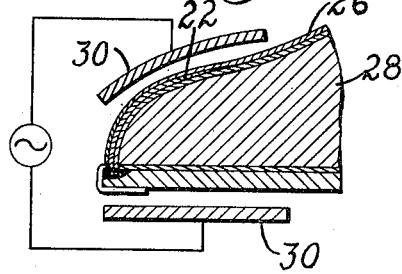
Fig. 6 is a sectional elevational view taken on line VII—VII of Fig. 5.

Sheets 10 of the resin and modifying agent composition or coated or impregnated fabric 18 may be cut to form stiffening blanks 22 (see Fig. 4) for stiffening end portions of a shoe. These blanks 22 are thin sheets having an outline shape corresponding to the outline shape of the end portions of a shoe to be stiffened and may have skived edge portions 24. The material is readily cut either with a knife or with a die, since the deposited resin-modifying agent material is not, at this stage, tough or gummy. The stiffener blanks are limp, stretchable and lastable, and may be incorporated in shoes 26 according to the usual shoemaking methods or may be stitched in place in a shoe upper before placing the upper on a last 28 or other form. Thereafter, the shoes 26 are shaped as by lasting and the blanks 22 hardened by heating them, for example in a high-frequency field established between spaced electrodes 30 as shown in Figs. 5 and 6, or in a heating chamber or by radiant heat, while the shoe is maintained in shape, and cooling the shoes 26 prior to removal from the lasts 28.

In a preferred form of the invention wherein the stiffener material may be employed either as a self-sustaining sheet or as an impregnant for a fabric base, a rubbery material may be combined with the liquid modifying agent to form a relatively soft continuous phase 12 and the resin particles 14 thereafter dispersed throughout the combination of rubbery material and liquid modifying agent. This form of stiffener material may be made by known methods which operate to form a continuous phase 12 of a rubbery material and a liquid modifying agent having fine particles 14 of a heat softenable material dispersed through the continuous phase. One such method involves working a rubbery material to a somewhat plastic condition, for example to a condition in which it will form a band on a conventional two-roll rubber mill, thereafter adding and homogeneously mixing the liquid modifying agent with the rubbery material and finally incorporating the finely divided heat softenable material on the mill and milling the mixture only enough to distribute the particles throughout the rubbery material. During the incorporation of the heat softenable material, the temperature of the mixture is kept at least as low as the softening or flow point of the heat softenable particles 14 so that they remain in the form of fine particles in a matrix of rubbery material. When the fine particles have been distributed throughout the rubbery material, the material is sheeted out on cooled rolls. For stiffening box toes it has been found desirable to employ hardenable sheet material which may be from 0.03 to 0.06 inch in thickness.

Alternatively, the rubbery material, modifying agent and heat softenable particles may be combined in the presence of a volatile organic solvent for the rubbery material in a ball mill or other mixer. The resultant mixture may then be cast as a film or may be impregnated into a fabric base 18 to provide a hardenable sheet material comprising particles of heat softenable material in a matrix of rubbery material containing a modifying agent.

The hardenable sheet material may be cut to provide stiffener blanks 22, for example by cutting the sheet to form an outline shape corresponding to the outline shape of the end portion of a shoe to be stiffened. The resulting blanks are limp, stretchable and lastable and may be used in shoemaking as described above.

In compositions comprising rubbery material in addition to the modifying agent and resinous particles, it appears that the liquid modifying agent prior to heating softens the rubbery material to a thick plastic mass that has substantially no effect on the resinous particles. Thus the modifying agent reduces the stiffness and increases the stretchability of such a composition before heating. Upon heating, a substantial portion of the modifying agent is withdrawn from the rubbery material and enters into combination with the resinous particles to soften the particles and cause them to coalesce into a continuous network 16 of resinous material extending throughout the body 32 of rubbery material. A combined stiffening effect is thus obtained not only by the coalescing of the resinous particles to a continuous network 16 but also by the stiffening of the rubbery material 32 due to withdrawal of modifying agent from the rubbery material into the resinous material.

Numerous resinous materials may be used for the stiffener compositions of the present invention. However, vinyl chloride-vinyl acetate copolymers containing a greater percent of vinyl chloride than of vinyl acetate have been found most satisfactory, but polymers of vinyl chloride alone may also be used. In particular, the copolymers known as Vinylite VYNV Nos. 1 and 2, NV Nos. 3 and 4, VYNS and VYCM produced by the Carbide and Carbon Chemicals Corp. and having a vinyl chloride content of above 85% have been found particularly satisfactory. Vinylite VYNV Nos. 1 and 2 are copolymers of 95+% of vinyl chloride and <5% of vinyl acetate having intrinsic viscosities in cyclohexanone at 20° C. of 1.53 and 1.52 respectively, and specific gravities of 1.39. Vinylite NV-4 is a copolymer of 92+% of vinyl chloride and <8% of vinyl acetate. Vinylite VYNS is a copolymer of 90% of vinyl chloride having an intrinsic viscosity of 0.79 and a specific gravity of 1.39. Vinylite VYCM is a copolymer of 91% of vinyl chloride and 9% of vinyl acetate having an intrinsic viscosity of 1.38 and a specific gravity of 1.39. Vinylite NV-3 is a polymer of vinyl chloride alone. These resinous materials are preferably employed in the forms of very fine particles, but particles up to those capable of passing an 80 mesh screen are usable. It is possible that these larger particles may be broken up somewhat during mixing or other processing.

In combination with these resins, hydrocarbon oil modifying agents have been found particularly effective to soften the resin particles to the point of coalescence at elevated temperatures while exerting only a limited flexibilizing effect at normal temperatures. Suitable hydrocarbon oil modifying agents include a material known as "Dutrex" which is understood to be a residue containing some unsaturated materials in aromatic materials obtained as a residue from the purification or distillation of certain crude petroleums. "Dutrex" is available in two ranges of viscosity and boiling points: Dutrex 20 having a specific gravity at 20° C. of 1.03, a viscosity at 100° F. of 4600 cs., a viscosity at 210° F. of 20 cs., and an initial boiling point of 182° C. at 1 mm.; and Dutrex 25 with corresponding specific gravity, viscosities and initial boiling point, respectively of 1.02, 146 cs., 6.9 cs. and 130° C. Another useful hydrocarbon oil modifying agent is "Sovaloid C" which is a synthetic aromatic oil produced by the Socony Vacuum Oil Co. Sovaloid C has a specific gravity of 1.052, a flash point of 335° F. and a distillation range of 580°–760° F.

Other modifying agents which may be used are materials which at elevated temperatures soften the resin particles to cause them to coalesce but which exhibit only a limited plasticizing effect on the resins at atmospheric temperatures such as tricresyl phosphate and triphenyl phosphate. With these limited plasticizers it is desirable to use a brittle heat-softening modifying resin in combination with the plasticizer material. Suitable brittle modifying resins for this purpose include Chlorowax 70 (a resinous chlorinated paraffin having a chlorine content of approximately 70%), wood rosin and phenol modified coumarone indene resins such as "Nevillac" produced by the Neville Co.

Of the rubbery materials employed, the polyisobutylenes such as the high molecular weight polyisobutylene known as Vistanex B 120 marketed by Advance Solvents Corp. have been found very satisfactory. Other polyisobutylenes may be used but it is preferred to use the higher molecular weight polymers, preferably those having a molecular weight of at least one-half that of Vistanex B 120. Other rubbery materials which may be used include "butyl rubber," i. e., a rubbery copolymer of isobutylene and a small percentage of isoprene, natural rubber and butadiene styrene copolymer rubbers and in general any essentially hydrocarbon rubbery material.

The formation of a stiff resilient final product is dependent upon combining materials of the type above described within certain ranges of relative proportions. In general, it may be said that there should be from 60% to 90% of resin particles with from 10% to 40% of modifying agent. The rubbery material, if employed in combination with hydrocarbon oil modifying agents cooperates to give the unique two-fold stiffening effect, and is used to the extent of from 1% to 20% based on the weight of the total composition.

Where brittle modifying resins are used as above discussed, they may be used in proportions up to 26% by weight of the total composition. Observable effects on the nature of the composition are obtained when as little as about ½% of the brittle resin is included.

The temperature required to effect stiffening of the compositions of the present invention depends in a large measure upon the resinous materials employed. In general, any of these compositions may be stiffened by temperatures of 250° F. or higher within a relatively short time such as 10 to 15 seconds and temperatures as low as 200° F. will operate to stiffen the compositions within a somewhat longer time.

The following examples are given to assist in understanding the invention; but it is to be understood that the invention is not restricted to the details of procedure or proportions of ingredients disclosed in the examples except as defined in the claims appended hereto:

*Example I*

| | Parts by weight |
|---|---|
| Vinylite NV #3 | 300 |
| Nevillac Soft | 100 |
| Sovaloid C | 60 |
| Stabilizer VIN | 5 |
| Vistanex B 120 | 15 |
| Toluene | 75 |
| Isopropyl acetate | 120 |
| Cyclohexane | 270 |

The above composition was thoroughly mixed in a ball mill, coated on a fabric and employed in making a shoe according to the procedure set forth in Example 1.

The resulting stiffened shoe had a somewhat softer box toe which was, however, sufficiently strong and resilient for use.

*Example II*

| | Parts by weight |
|---|---|
| Vinylite resin NV #3 | 325 |
| Tricresyl phosphate | 50 |
| FF wood rosin | 100 |
| Vistanex B-120 | 20 |
| Toluene | 1,000 |

The above composition was thoroughly mixed in a ball mill, coated on a fabric and employed in making a shoe according to the procedure set forth in Example I. The activation period used for this shoe was 16 seconds high-frequency treatment at a voltage of 3 kilowatts and a frequency of 160 megacycles.

The stiffened portion of the shoe was strong and resilient.

Having thus described my invention, what I claim as new and desire to secure by Letters Patent of the United States is:

1. The method of stiffening a selected portion of the upper of a shoe which comprises incorporating as a ply in the selected portion a normally limp sheet comprising a body of dispersion of which the continuous phase is a substantially homogeneous plastic mixture of a rubbery hydrocarbon polymer material and a liquid aromatic hydrocarbon oil modifying agent for the rubbery material, and the discontinuous phase comprises fine particles of a strong tough relatively hard thermoplastic resin polymer comprising above 85% of vinyl chloride, any remainder to a total of 100% being vinyl acetate at least partially compatible with said modifying agent, said resin particles being adapted to take up a portion of the modifying agent when the composition is heated and to soften and fuse together into a network of resin and, when cool, serving to stiffen the rubbery material, imparting to said selected portion a desired shape, thereafter, while holding the selected portion in the desired shape, heating said sheet material to cause said resin particles to take up the modifying agent and to fuse together into a continuous network of resin, and cooling said sheet material to harden the resin and stiffen the continuous phase of rubbery material.

2. The method of stiffening a selected portion of the upper of a shoe by incorporating as a ply in the selected portion a normally limp stiffener blank comprising a sheet having an outline shape corresponding to the outline shape of said selected portion and containing a body of dispersion of which the continuous phase is a substantially homogeneous plastic mixture of an essentially hydrocarbon polymer rubbery material and a liquid aromatic hydrocarbon oil softener for said rubbery material, and the discontinuous phase comprises fine particles of a tough, strong, relatively hard thermoplastic resin polymer comprising above 85% of vinyl chloride, any remainder to a total of 100% being vinyl acetate at least partially compatible with said hydrocarbon oil, said resin particles being substantially undissolved by said hydrocarbon oil at normal atmospheric temperature and being at least partially dissolved by said hydrocarbon oil at elevated temperature, lasting the upper, thereafter, while holding the selected portion in lasted condition subjecting the blank to heating to cause said resin particles to take up a portion of the hydrocarbon oil and to soften and fuse together into a network of resin extending through the rubbery material, and cooling the blank to stiffen the resin and the rubbery material through which it extends.

3. The method of stiffening a selected portion of an upper of a shoe by incorporating as a ply in the selected portion a normally limp stiffener blank comprising a sheet having an outline shape corresponding to the outline shape of said selected portion and which comprises a body of dispersion of which the continuous phase is a substantially homogeneous plastic mixture of from 1 to 20 parts by weight of a rubbery polymer of isobutylene and from 10 to 40 parts by weight of an aromatic hydrocarbon oil softener for said rubbery material, and the discontinuous phase comprises fine particles of a thermoplastic resin copolymer of vinyl chloride and vinyl acetate comprising above 85% by weight of vinyl chloride, said resin particles being substantially undissolved by said hydrocarbon oil at normal atmospheric temperature and being at least partially dissolved by said hydrocarbon oil at elevated temperatures, the combined weight of said rubbery polymer, hydrocarbon oil, and thermoplastic resin being 100 parts by weight, lasting the upper, thereafter, while holding the selected portion in lasted condition, subjecting the blank to heating to cause said resin particles to take up a portion of the hydrocarbon oil and to soften and fuse together into a network of resin extending through the rubbery material, and cooling said blank to stiffen the resin and the rubbery material through which it extends.

4. As an article of manufacture a stiffener blank for stiffening end portions of shoes which comprises a normally limp thin sheet material having an outline shape corresponding to the outline shape of an end portion to be stiffened, said sheet material comprising a body of dispersion of which the discontinuous phase comprises fine particles of a strong, tough, relatively hard thermoplastic resin polymer comprising above 85% of vinyl chloride, any remainder to a total of 100% being vinyl acetate and the continuous phase is a substantially homogeneous plastic mixture of a rubbery hydrocarbon polymer material and a liquid aromatic hydrocarbon oil modifying agent for the rubbery material which softens the rubbery material, has substantially no effect on the resin at atmospheric temperatures and which at elevated temperatures softens and partially dissolves said particles to cause them to coalesce, whereby said blank may be converted to a stiff, resilient condition by heating to effect at least partial solution of said resin and said modifying agent to form a continuous network of modified resin capable on cooling of stiffening said blank.

5. As an article of manufacture a stiffener blank for stiffening end portions of shoes said stiffener blank being a normally limp relatively thin sheet having an outline shape corresponding to the outline shape of an end portion to be stiffened, said sheet material comprising a body of dispersion of which the discontinuous phase includes fine particles of a thermoplastic resin copolymer of vinyl chloride and vinyl acetate comprising above 85% by weight of vinyl chloride, and the continuous phase includes a substantially homogeneous plastic mixture of from 1 to 20 parts by weight of a rubbery polymer of isobutylene and from 10 to 40 parts by weight of an aromatic hydrocarbon oil softener for said rubbery material, said hydrocarbon oil having substantially no effect on said copolymer resin at atmospheric temperatures and being capable at elevated temperatures of softening and partially dissolving said resin particles to cause them to coalesce into a continuous network whereby said blank may be converted to a stiff, resilient condition by heating to effect at least partial solution of said resin in said hydrocarbon oil to form a continuous network of hydrocarbon oil modified resin with accompanying withdrawal of hydrocarbon oil from said rubbery material.

References Cited in the file of this patent

UNITED STATES PATENTS

| | | |
|---|---|---|
| 1,215,875 | Schwartz | Feb. 13, 1917 |
| 1,979,461 | Frazier | Nov. 6, 1934 |
| 2,413,259 | Soday | Dec. 24, 1946 |
| 2,481,896 | Ziegler | Sept. 13, 1949 |
| 2,497,045 | Killingsworth et al. | Feb. 7, 1950 |
| 2,515,382 | Schwencke | July 18, 1950 |
| 2,539,608 | Brophy | Jan. 30, 1951 |
| 2,541,761 | Harrison | Feb. 13, 1951 |
| 2,572,184 | Newton | Oct. 23, 1951 |